United States Patent [19]
Satoh et al.

[11] Patent Number: 5,275,457
[45] Date of Patent: Jan. 4, 1994

[54] POWER OPERATED SEAT DEVICE

[75] Inventors: Munetaka Satoh, Kariya; Sadao Ito, Anjo; Hiroshi Nawa, Kariya, all of Japan

[73] Assignee: Aisin Seiki Kabushiki Kaisha, Kariya, Japan

[21] Appl. No.: 22,025

[22] Filed: Feb. 24, 1993

[30] Foreign Application Priority Data

Feb. 29, 1992 [JP] Japan ................................ 4-044144

[51] Int. Cl.$^5$ .............................................. B60N 1/02
[52] U.S. Cl. ...................... 296/65.1; 248/419; 248/422; 248/393
[58] Field of Search ............... 296/65.1; 248/419, 422, 248/393

[56] References Cited

U.S. PATENT DOCUMENTS

| | | | |
|---|---|---|---|
| 4,787,594 | 11/1988 | Ikegaya et al. | 248/422 |
| 4,834,333 | 5/1989 | Saito et al. | 248/422 |
| 4,903,931 | 2/1990 | Shimazaki | 296/65.1 |
| 5,112,018 | 5/1992 | Wahls | 248/419 |

FOREIGN PATENT DOCUMENTS 1-145833 10/1989 Japan.

*Primary Examiner*—Robert R. Song
*Attorney, Agent, or Firm*—Finnegan, Henderson, Farabow, Garrett and Dunner

[57] ABSTRACT

A power operated seat device comprises: a pair of lower rails for fixing to a floor of a vehicle, a pair of upper rails for mounting a seat cushion of the vehicle mounted slidably on the lower rails respectively, each of the upper rails having an upstanding flange portion with a notch, a pair of brackets each of which is mounted detachably to the side of the corresponding flange portion so as to cover the notch, a rotational rod rotatably supported at both ends thereof to the corresponding bracket, a power source for rotating the rotational rod, and an adjusting the height mechanism provided between one of the upper rails and the seat cushion, and which is connected to the rotational rod and adjusts the height of a portion of the seat cushion by rotating of the rod.

4 Claims, 2 Drawing Sheets

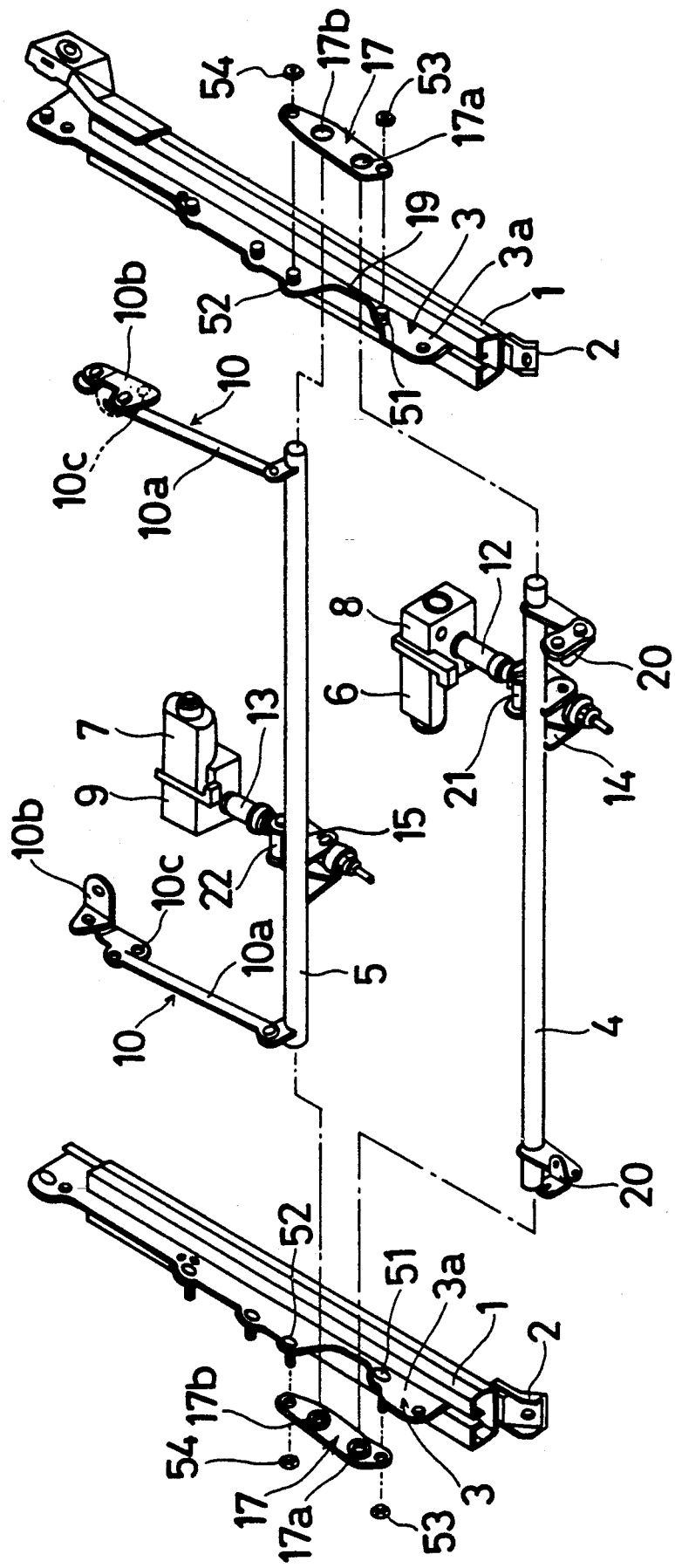

POWER OPERATED SEAT DEVICE

BACKGROUND OF THE INVENTION

1. Field of the Invention

This invention relates to a power operated seat device for use in a vehicle.

2. Description of the Related Art

A conventional power operated seat device is disclosed in Japanese Utility Model laid open Print No. 1(1989)-145833. The power operated seat device disclosed in the prior art comprises a pair of lower rails for fixing to a floor of a vehicle and a pair of upper rails for fixing to a seat cushion of the vehicle and mounted slidably on the lower rails. The power operated seat device includes a pair of brackets which are mouted on the upper rails by welding respectively and includes a pair of rotational rods each of which is rotatably supported at both ends thereof to the corresponding bracket.

The each bracket is formed integrally with the corresponding upper rail. Therefore in case of connecting the rotational rods to the brackets after mounting the upper rails on the lower rails, because the upper rails should be spread each other, the lower rails should be removed from a jig on which the lower rails are mounted. Furthermore after one of the rods is inserted into the brackets, the other rod should be inserted into the brackets. Therefore a pair of E-rings should be used for the fitting of the both ends of the one rod in order to prevent the falling down thereof from the brackets, and it takes a long time to construct the power operated seat device.

SUMMARY OF THE PRESENT INVENTION

It is an object of the present invention to provide a power operated seat device which can be constructed easily.

It is another object of the present invention to provide a power operated seat device which can be suitable for applying an automatic assembly.

To achieve the above mentioned objects, this invention provides a power operated seat device comprising: a pair of lower rails for fixing to a floor of a vehicle, a pair of upper rails for mounting a seat cushion of the vehicle mounted slidably on the lower rails respectively, each of the upper rails having an upstanding flange portion with a notch, a pair of brackets each of which is mounted detachably to the side of the corresponding flange portion so as to cover the notch, a rotational rod rotatably supported at both ends thereof to the corresponding bracket, a power source for rotating the rotational rod, and an adjusting the height mechanism provided between one of the upper rails and the seat cushion, and which is connected to the rotational rod and adjusts the height of a portion of the seat cushion by rotating of the rod.

BRIEF DESCRIPTION OF THE DRAWINGS

The features and advantages of the power operated seat device according to the present invention will be more clearly appreciated from the following description in conjunction with the accompanying drawings wherein:

FIG. 2 is a partial exploded perspective view of power operated seat device which illustrates the power operated seat device according to the present invention.

DETAILED DESCRIPTION OF A PREFERRED EMBODIMENT OF THE INVENTION

Figure 1:
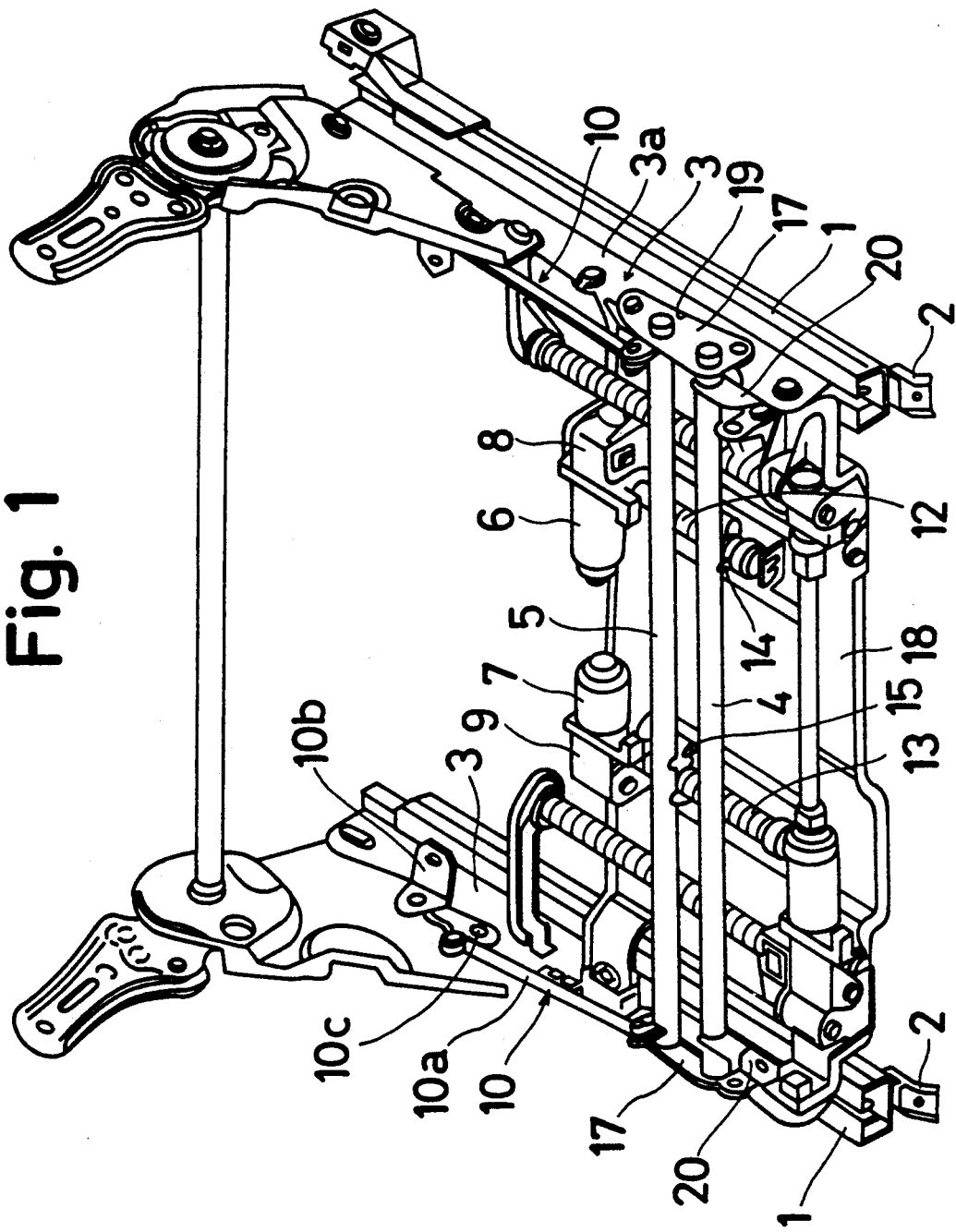
FIG. 1 is a perspective view of a power operated seat device of the present invention.

In FIG. 1 and FIG. 2 a pair of lower rails 1 are fixed to a floor (not shown in the FIGURES) of a vehicle by a pair of mounting members 2. The lower rails 1 are formed into a U-shaped configuration in the sectional view. A pair of upper rails 3 each of which comprises a flange portion 3a are supported by the lower rails 1 slidably in the lengthwise direction of the vehicle. The flange portions 3a are fixed to a seat cushion (not shown in the FIGURES) of the vehicle. A plate 18 on which a pair of electric motors 6 and 7 are mounted is fixed to one of the upper rails 3 at one end thereof and to the other upper rail 3 at the other end thereof.

In FIG. 2 each of the flange portions 3a comprises a notch 19. A pair of brackets 17 are respectively mounted to the outsides of the flange portions 3a covering the notches 19 by bolts 51 and 52, and nuts 53 and 54. A rotational rod 4 is inserted rotatably at the ends thereof in a pair of openings 17a of the brackets 17 and a rotational rod 5 is inserted rotatably at the ends thereof in a pair of openings 17b of the brackets 17.

A screw shaft 12 is connected to the rotational rod 4 and the electric motor 6 is connected to the screw shaft 12 through a reduction mechanism 8. A nut 21 engages with the screw shaft 12 slidably in the lengthwise direction of the screw shaft 12. The nut 21 is connected to a link mechanism 14 fixed to the rotational rod 4. A pair of link mechanisms 20, as ascending and descending mechanisms, are connected to the end portions of the rotational rod 4 respectively and disposed between the upper rails 3 and the seat. The link mechanisms 20 ascend and descend the front side of the seat by rotation of the rotational rod 4.

In the above structure, rotational torque generated by rotation of the electric motor 6 is transmitted to the screw shaft 12 through the reduction mechanism 8. Therefore the nut 21 is moved in the lengthwise direction of the screw shaft 12 and the rotational rod 4 rotates together with the link mechanisms 20. Swingings of the link mechanisms 20 adjust the height position of the front side of the seat.

On the other hand a screw shaft 13 is connected to the rotational rod 5 and the electric motor 7 is connected to the screw shaft 13 through a reduction mechanism 9. A nut 22 engages with the screw shaft 13 slidably in the lengthwise direction of the screw shaft 13. The nut 22 is connected to a link mechanism 15 fixed to the rotational rod 5. A pair of link mechanisms 10, as ascending and descending mechanisms, are connected to the end portions of the rotational rod 5 respectively and disposed between the upper rails 3 and the seat. Each of the link mechanisms 10 comprises a supporting portion 10a connected to the rotational rod 5, a bracket portion 10b engaging with the rear side of the seat and a central portion 10c operating as a center of rotating of the bracket portion 10b.

In the above structure, rotational torque generated by rotation of the electric motor 7 is transmitted to the screw shaft 13 through the reduction mechanism 9. Therefore the nut 22 is moved in the lengthwise direction of the screw shaft 13 and the rotational rod 5 rotates integrally with the supporting portions 10a of the link mechanisms 10 through the link mechanism 15. By swinging of the supporting portions 10a of the link mechanisms 10 each of the bracket portions 10b rotates about the center portion 10c in the same direction of swinging of the supporting portions 10a. The bracket portions 10b adjust the height position of the rear side of the seat.

The each bracket 17 of the present invention is formed deatachably with each of the upper rails 3. Therefore the rotational rods 4 and 5 are able to be inserted into the brackets 17 without spreading the upper rails 3 each other, and the lower rails 1 don't have to be detached from a jig on which the lower rails 1 are mounted. Furthermore because the both rotational rods 4 and 5 are able to be inserted to one of the brackets 17 at the same time, it is not necessary to use an E-ring in inserting the rotational rods 4 and 5 to the brackets 17.

In case of using a pair of brackets 17 for fixing the both upper rails 3, because the brackets 17 may be moved horizontally to be connected with the rotational rods 4 and 5 lowered vertically, it is easy to apply an automatic assembly of the power operated seat device.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A power operated seat device comprising:
   a pair of lower rails for fixing to a floor of a vehicle;
   a pair of upper rails for mounting a seat cushion of the vehicle mounted slidably on the lower rails respectively, one of the upper rails having an upstanding flange portion with a notch;
   a bracket mounted detachably to the side of the flange portion so as to cover the notch;
   a rotational rod rotatably supported at both ends thereof to the bracket and the other upper rail;
   a power source for rotating the rotational rod; and
   means mounted on the rotational rod for moving a portion of the seat cushion in the vertical direction.

2. A power operated seat device comprising:
   a pair of lower rails for fixing to a floor of a vehicle;
   a pair of upper rails for mounting a seat cushion of the vehicle mounted slidably on the lower rails respectively, each of the upper rails having an upstanding flange portion with a notch;
   a pair of brackets each of which is mounted detachably to the side of the corresponding flange portion so as to cover the notch;
   a rotational rod rotatably supported at both ends thereof to the corresponding bracket;
   a power source for rotating the rotational rod; and
   means mounted on the rotational rod for moving a portion of the seat cushion in the vertical direction.

3. A power operated seat device as recited in claim 1, wherein the bracket is secured to the flange portion by means of plural sets of a bolt and a nut.

4. A power operated seat device as recited in claim 2, wherein each of the brackets is secured to the flange portion by means of plural sets of a bolt and a nut.

* * * * *